United States Patent Office 3,510,457
Patented May 5, 1970

3,510,457
PROCESS FOR PREPARING FINELY GRANULATED UNSATURATED POLYESTERS
Harald Janssen, Witten-Heven, Germany, assignor to Dynamit Nobel Aktiengesellschaft, Troisdorf, Germany
No Drawing. Filed July 25, 1968, Ser. No. 747,439
Claims priority, application Germany, July 27, 1967,
D 53,709
Int. Cl. C08g 53/02
U.S. Cl. 260—75           15 Claims

ABSTRACT OF THE DISCLOSURE

Partially crystalline unsaturated polyesters in finely granulated form produced by condensing fumaric acid and/or maleic acid, or the anhydride thereof, with a symmetrical diprimary diol in the presence of a catalyst effecting conversion of maleic acid units, if present, into fumaric acid units, stirring the melt of polyester into a liquid organic medium and recovering and drying the resultant crystalline slurry. The liquid organic medium used is a non-solvent for the polyester. Examples thereof include methanol, ethanol, acetone and methyl ethyl ketone.

Background of the invention

This invention relates to unsaturated polyesters. More particularly, it relates to a process for the production of partially crystalline unsaturated polyesters in finely granulated form.

As is known in the prior art, unsaturated polyesters are condensation products of ethylene-$\alpha,\beta$-dicarboxylic acids or the derivatives thereof and polyhydric alcohols. Maleic acid, in the form of its anhydride, is primarily employed as the acid component. Less customary is the use of the stereoisomeric fumaric acid or of methyl-substituted ethylene-$\alpha,\beta$-dicarboxylic acids, such as mesaconic acid and citraconic acid.

In order to modify the properties of the final technical products, saturated aliphatic or aromatic carboxylic acids are also partially employed in place of the unsaturated carboxylic acids.

The polyhydric alcohols predominantly employed are diols, such as mono- and diethylene glycol, propylene glycol and higher homologs thereof.

The unsaturated polyesters are usually dissolved in monomeric vinyl, allyl or acrylic compounds, and these so-called unsaturated polyester resins are cured by means of organic peroxides and, optionally, accelerators, to solid, insoluble and unmeltable, three-dimensionally cross-linked copolymers. In addition to being utilized in the varnish and casting resin arts, these liquid unsaturated polyester resins are processed in most cases together with fillers of various types, preferably glass fiber materials, into reinforced thermosetting molded articles. The customary processing methods, such as the hand lay-up process, the vacuum bag and pressure bag molding process, the preform process, and others, are described, for example, in a book by H. Hagen, "Glasfaserverstärkte Kunststoffe" (Glass-Fiber Reinforced Plastics), Springer Publishers, 1961. The conventional processes often require a considerable expenditure of manual work. Another disadvantage of such processes is that the processing of the raw materials into utilizable mixtures is very complicated.

Therefore, in recent times, the polyester molding compositions supplied in pasty or solid form have gained increasing importance. These compositions already contain all of the substances required for the production of molded parts, i.e., in addition to fillers—such as glass fibers or minerals—they also contain peroxidic catalysts and can be cured directly with the application of pressure and heat. In addition to this simplification from the viewpoint of processing technology, molded parts obtained in this manner exhibit improved mechanical and electrical properties in some cases. Also advantageous from the aspect of mass production are the shorter mold release times obtainable by the utilization of pressure and elevated temperatures.

A distinction is made between fluid or pourable polyester molding compositions and those having a straw-like to putty consistency. Fluid molding compositions are particularly popular in the art because they can be readily metered and they can be used in the extrusion molding method. Such materials have gained increasing importance, preferably for the manufacture of smaller molded parts in a series production procedure.

The production of the preferred fluid polyester molding compositions is generally conducted by first preparing a preliminary mixture from the starting substances and then homogenizing said mixture on heated mixing rolls. After the homogenization step is terminated, the rough sheet is cut off and, after being removed from the mill rolls, is processed by means of a suitable comminuting machine into a granular mass. In order to obtain completely fluid polyester molding compositions and for the purpose of rendering this process economical, it is necessary that the starting materials for the preliminary mixture, i.e., including the unsaturated polyesters, be present in a dry, fluid phase.

Unsaturated monomer-free polyesters of the desired consistency, preferably those having a particularly suitable partially crystalline structure, are obtained when starting materials such as those mentioned hereinabove are employed which have a symmetric structure. Thus, a particularly suitable ethylene-$\alpha,\beta$-dicarboxylic acid is fumaric acid. However, maleic acid or maleic acid anhydride can also be employed, in combination with catalysts effecting an extensive isomerization, i.e., conversion of the maleic acid units into fumaric acid units, during the preparation of the polyester. Suitable isomerization catalysts are, for example, the cyclic secondary amines, particularly piperidine, disclosed in U.S. Pat. No. 3,373,144, issued on Mar. 12, 1968, or iodine, as is taught in DAS 1,113,087, or sulfur. Preferred diols are diprimary diols having an even-numbered unbranched carbon chain, such as, for example, ethanediol-1,2; butanediol-1,4; hexanediol-1,6; and decanediol-1,10. Preferred saturated carboxylic acids are symmetrically constructed dicarboxylic acids, such as, for example, adipic acid, sebacic acid or terephthalic acid, as well as the lower alkyl esters thereof.

Thus, an unsaturated polyester having an acid number of about 20, prepared from fumaric acid, adipic acid and butanediol-1,4 in a molar ratio of 4:1:5–5.5 in accordance with the conventional melt condensation process, solidifies upon cooling to a partially crystalline product having a softening point of about 105° C. [in accordance with DIN (German Industrial Standard) 53,180]. By varying the molar ratio of fumaric acid to adipic acid, or by exchanging the starting materials besides fumaric acid completely or partially for the other above-mentioned starting materials, unsaturated polyesters having varying degrees of crystallization and thus differing softening points can be produced. Thus, the saturated acid, for example, adipic acid, and the diol, for example, butanediol can be replaced completely or partially by other saturated acids or other diols, respectively. The finely granulated or grained form necessary for producing the desirable fluid molding compositions is normally obtained by mechanical comminution of the solidified melt of these unsaturated polyesters. For example, the still-flowable melt is introduced, preferably under an inert gas atmosphere, into suitable troughs from which the melt is removed after solidification. Thereafter, a coarse comminution step and a fine comminution step follow in crushers and mills, respectively. However, the entire procedure is very complicated. The removal from the troughs can be accomplished generally only after one or up to several days, depending upon the size of the troughs and the type of unsaturated polyester. Such a removal, accomplished by inverting the troughs, does not always take place smoothly and involves manual work. The granulation steps required in order to produce the finely grained form involve many problems, particularly in the case of unsaturated polyesters having lower softening points because of their tendency to become tacky by the considerable development of frictional heat.

Summary of the invention

One of the objects of the present invention is to provide a process for the production of partially crystalline unsaturated polyesters in finely granulated or grained form which overcomes the disadvantages and deficiencies of the prior-art methods.

Another object of the present invention is to provide a process for producing finely granulated unsaturated polyesters which may be carried out effectively, yet in a relatively simple manner.

A still further object of the invention is to provide partially crystalline unsaturated polyesters having a finely granulated form, which polyesters may be used for producing fluid molding compositions.

A still further object of the invention is to provide the above-described process which has the advantage over the prior-art methods that no mechanical comminution procedure is required.

These and other objects and advantages of the present invention will become apparent to those skilled in the art from a consideration of the following specification and claims.

A process has now been developed, in accordance with the present invention, for the production of partially crystalline unsaturated polyester in finely granulated form by the condensation of fumaric acid and/or maleic acid, or the anhydride thereof, in the presence of catalysts which effect an extensive conversion of maleic acid into fumaric acid units during the polyester preparation, and symmetrical, diprimary diols. Optionally, symmetrical saturated dicarboxylic acids and/or the lower dialkyl esters thereof can be concomitantly utilized during the process. This process is particularly characterized by the feature that the still-flowable melt of unsaturated polyesters is stirred into liquid organic media, which are non-solvents for the unsaturated polyesters, after the termination of the condensation process. The resultant crystalline slurry is then filtered off and dried. The fact that the partially crystalline unsaturated polyesters are obtained in finely granulated form when their melts are stirred into the said liquid organic media is a surprising and unexpected result.

Thus, in accordance with the concept of the present invention, the partially crystalline unsaturated polyesters are preferably produced from the above-mentioned symmetrical starting materials. The softening points of the resultant polyesters range approximately between 80° and 120° C.

Suitable liquid organic media for the described process may be any of a large number of products. Such materials are readily available from a technical point of view, since the partially crystalline unsaturated polyesters have a poor solubility in the conventional solvents at normal temperatures. Suitable liquid non-solvents which may be employed include, for example, organic compounds having boiling points below 100° C. Examples thereof are alcohols, such as methanol, ethanol, n-propanol, isopropanol, n-butanol, sec-butanol, isobutanol, tert-butanol, methoxybutanol, amyl alcohols, 2-ethylhexanol, cyclohexanol, diacetone alcohol; esters of organic acids, such as methyl acetate, ethyl acetate, n-propyl acetate, isopropyl acetate, butyl acetates, amyl acetates, 2-ethylhexyl acetate, 3-methoxybutyl acetate, methyl propionate, ethyl propionate; ethers, such as dioxane, tetrahydrofuran, methyl glycol, ethyl glycol, propyl glycol, butyl glycol, methyl diglycol, ethyl diglycol, propyl diglycol, butyl diglycol, methyl glycol acetate, ethyl glycol acetate, butyl glycol acetate; ketones, such as acetone, methyl ethyl ketone, methyl propyl ketone, methyl isobutyl ketone, methyl n-amyl ketone, methyl isoamyl ketone; liquid paraffinic hydrocarbons, preferably mixtures, such as, for example, commercially available special gasoline or white spirits; chlorinated hydrocarbons, such as dichlorethylene, trichloroethylene, perchloroethylene, 1,1,1 - trichloroethane, carbon tetrachloride; aromatics, such as benzene, toluene, xylenes, cumene, ethyl benzene, cumene, and others.

For practical reasons, especially the low temperatures employed during drying, the low-boiling compounds (boiling point <100° C.) are preferred among the above exemplary substances. In particular, methanol is especially advantageous since it is economical. Other preferred non-solvents for the unsaturated polyesters include ethanol, acetone and methyl ethyl ketone. Also from the point of view of economic considerations, the amount of liquid organic medium employed should be maintained as small as possible. For example, in the case of employing methanol and the standard polyester described above, a weight ratio of polyester melt to liquid organic medium of 3:2 can be maintained. In the case of unsaturated polyesters having a low crystallization tendency, it is recommended to increase somewhat the content of liquid organic media, preferably to a weight ratio of 1:1.

The unsaturated polyesters are preferably produced in the melt at temperatures between about 150° and 210° C. Additional details of the process can be seen from the examples described hereinbelow. Conventional details for producing unsaturated polyesters by the condensation procedure are known to the art.

The following examples are given merely as illustrative of the present invention and are not to be considered as limiting. Unless otherwise noted, the percentages therein and throughout the application are by weight.

EXAMPLES OF THE INVENTION

Example 1

In order to produce the partially crystalline unsaturated polyester described above, 255 parts of fumaric acid, 80 parts of adipic acid and 272 parts of butanediol-1,4 are heated in a flask equipped with a stirrer within 5 hours to 200° C. under an inert gas atmosphere. The thus-produced water is removed by distillation. This temperature is maintained until the acid number has decreased to 20. Thereafter, the melt (theoretical yield after the water has been split off=510 parts) is cooled to 120° C. and is introduced by way of an outlet pipe into a vessel equipped with an agitator and a cooling jacket, wherein 340 parts of methanol has been previously charged. The methanol is stirred well during the introduction of the polyester melt. The heat is extensively removed by passing cold water through the double wall of the vessel.

The unsaturated polyester precipitates at once in powdery form. After the entire amount of the melt has been introduced, a powdery slurry results which, however, can still be successfully stirred. The resultant white powder is freed of methanol by filtering or centrifuging and is dried for about 2 hours at 70° C. in a drying chamber. The yield of dry product is 500 parts (98% of the theoretical yield). The softening point in accordance with DIN 53,180, is 105° C.

Example 2

The polyester described in Example 1 can also be produced from maleic acid anhydride, in place of fumaric acid, and isomerization catalysts. For this purpose, 215.5 parts of maleic acid anhydride, 80 parts of adipic acid, 272 parts of butanediol-1,4 and 2.5 parts of piperidine are condensed to an acid number of 20 in accordance with the method set forth in Example 1. Thereafter, the hot melt, having a temperature of 120° C. (theoretical yield=508 parts) is stirred into 339 parts of methanol as described in Example 1. The yield of dry product is 500 parts (98.5% of the theoretical yield).

Example 3

In place of piperidine, 0.431 part of iodine is employed as the isomerization catalyst. The charge otherwise is the same as described in Example 2, and the process is conducted under the same conditions and in the same manner. The yield of dry product corresponds to 97% of the theoretical yield.

Example 4

In order to produce a partially crystalline unsaturated polyester which imparts improved strength properties to the fluid molding compositions produced therefrom, the modifying adipic acid is replaced by terephthalic acid—in the form of the dimethyl ester thereof. For this purpose, 72 parts of dimethyl terephthalate, 184 parts of butanediol-1,4 and 0.036 part of lead oxide are heated in a stirrer flask provided with a packed column within 6 hours to 200° C. Starting at about 150° C., the methanol is split off in this ester interchange. The methanol vapors are condensed in a cooler, after passing the column, and are collected in a calibrated receiver. After the theoretical amount of methanol of 24 parts is obtained, the charge is cooled to 160° C. At this temperature, 172 parts of fumaric acid is added. The column is replaced by a descending cooler in order to condense the water vapors. The charge is maintained for 2 hours at 160° C. and is then heated within 3 hours to the final temperature of 205° C. After reaching an acid number of 22, the charge (theoretical yield after the methanol and water have been split off=351 parts) is cooled to 130° C. The still-flowable melt is stirred into 235 parts of methanol, as described in Example 1. After centrifuging and drying, 346 parts, corresponding to a theoretical yield of 98.5%, of a white polyester powder is obtained. The softening point thereof is 108° C.

The following particle size distribution results from an orientation screen analysis on the product:

Percent by wt.
<40μ _____ 13
40–200μ _____ 34
>200μ _____ 53

Example 5

In order to obtain an unsaturated polyester having a low softening point, which is more advantageous for the production of fluid molding compositions on heated mixing mills, 75 parts of dimethyl terephthalate, 147 parts of butanediol-1,4, 30 parts of ethylene glycol and 0.037 part of lead oxide are subjected, in the manner described in Example 4, first to an ester interchange reaction and, then, after the addition of 179 parts of fumaric acid, to a condensation reaction. After reaching an acid number of 24, the melt, cooled to 105° C. (theoretical yield after splitting off the methanol and water=350 parts), is stirred in the manner described in Example 1 into 350 parts of methanol. In the final stage, 344 parts, corresponding to a theoretical yield of 98.3%, of a white polyester powder is obtained having a softening point of 83° C.

The product exhibits the following particle size distribution:

Percent by wt.
<40μ _____ 3.8
40–200μ _____ 31.2
>200μ _____ 65.0

Example 6

In order to produce an unsaturated polyester having a particularly low water absorption in the molding compositions produced therefrom, 129 parts of dimethyl terephthalate, 402 parts of hexanediol-1,6, and 0.065 part of lead oxide are first subjected to ester interchange and, then, after the addition of 308 parts of fumaric acid, to condensation. After attaining an acid number of 21, the melt, cooled to 110° C. (theoretical yield after the methanol and water have been split off=700 parts), is stirred into 700 parts of methanol in the manner set forth in Example 1. In the final stage, 694 parts, corresponding to a yield of 99%, of a white polyester powder is obtained. The softening point thereof is 92° C.

The product has the following particle size distribution:

Percent by wt.
<40μ _____ 3
40–200μ _____ 32
>200μ _____ 65

Examples 7–25

In the following examples, other liquid organic media are employed with the already-mentioned unsaturated polyesters. The remainder of the procedure otherwise corresponds to the process described in Example 1. For drying the resultant filter or centrifuged powder, a tumbler-dryer, steam-heated and evacuable to about 2 mm. Hg proved to be quite suitable, preferably in the case of higher-boiling organic media. In all cases, the yields of finely granulated white polyester product range between 97 and 99% of the theoretical yield.

| Ex. No. | Unsaturated polyester according to Example No. | Liquid organic medium | Weight ratio of polyester/ liquid organic medium | Temperature of the polyester melt when introduced by stirring, ° C. |
|---|---|---|---|---|
| 7 | 1 | Methylacetate | 1:1 | 120 |
| 8 | 4 | ___do___ | 1:1 | 130 |
| 9 | 5 | ___do___ | 1:1 | 105 |
| 10 | 1 | Ethylacetate | 1:1 | 120 |
| 11 | 4 | Acetone | 1:1 | 130 |
| 12 | 5 | ___do___ | 1:1 | 105 |
| 13 | 1 | Methyl ethyl ketone | 1:1 | 120 |
| 14 | 4 | ___do___ | 1:1 | 130 |
| 15 | 5 | ___do___ | 1:1 | 105 |
| 16 | 1 | Methyl isobutyl ketone | 1:1 | 120 |
| 17 | 4 | Cyclohexanone | 1:1 | 130 |
| 18 | 1 | Toluene | 1:1 | 120 |
| 19 | 4 | ___do___ | 1:1 | 130 |
| 20 | 5 | ___do___ | 1:1 | 105 |
| 21 | 4 | Xylene | 1:1 | 130 |
| 22 | 1 | Trichloroethylene | 1:1 | 120 |
| 23 | 4 | ___do___ | 1:1 | 130 |
| 24 | 5 | ___do___ | 1:1 | 105 |
| 25 | 1 | Perchloroethylene | 1:1 | 120 |

The invention being thus described, it will be obvious that the same may be varied in many ways. Such variations are not to be regarded as a departure from the spirit and scope of the invention, and all such modifications are intended to be included within the scope of the following claims.

I claim:

1. A process for the production of partially crystalline unsaturated polyesters in finely granulated form which comprises condensing (a) fumaric acid, maleic acid, a mixture of fumaric acid and maleic acid or maleic acid anhydride, in the presence of a catalyst if maleic acid units are present, said catalyst effecting conversion of the maleic acid units into fumaric acid units during the production of the polyester, with (b) a symmetrical diprimary diol, stirring the still-flowable melt of unsaturated polyester, after the termination of the condensation step, into a liquid organic medium selected from the group consisting of alcohols, carboxylic acid esters, ethers, ketones, paraffinic hydrocarbons, chlorinated hydrocarbons and aromatic hydrocarbons, said medium being non-solvent for the unsaturated polyester, and recovering and drying the resultant crystalline slurry.

2. The process of claim 1, wherein said non-solvent organic medium is an organic liquid having a boiling point of less than 100° C.

3. The process of claim 1, wherein said non-solvent organic medium is selected from the group consisting of methanol, ethanol, acetone and methyl ethyl ketone.

4. The process of claim 1, wherein at least one compound selected from the group consisting of symmetrical saturated dicarboxylic acids, the lower dialkyl esters of said acids and mixtures thereof is concomitantly condensed with said diol.

5. The process of claim 1, wherein said catalyst is selected from the group consisting of cyclic secondary amines, iodine and sulfur.

6. The process of claim 5, wherein the cyclic secondary amine is piperidine.

7. The process of claim 1, wherein said diol contains an even number of carbon atoms.

8. The process of claim 1, wherein the condensation reaction is carried out at a temperature of about 150° to 210° C.

9. The process of claim 1, wherein the weight ratio of polyester melt to liquid organic medium ranges from about 3:2 to 1:1.

10. A process for the production of partially crystalline unsaturated polyesters in finely granulated form which comprises condensing (a) fumaric acid, maleic acid, a mixture of fumaric acid and maleic acid or maleic acid anhydride, in the presence of a catalyst if maleic acid units are present, said catalyst effecting conversion of the maleic acid units into fumaric acid units during the production of the polyester, with (b) a symmetrical diprimary diol, stirring the still-flowable melt of unsaturated polyester, after the termination of the condensation step, into a liquid organic medium having a boiling point of less than 100° C. and being selected from the group consisting of alcohols, carboxylic acid esters, ethers, ketones, paraffinic hydrocarbons, chlorinated hydrocarbons and aromatic hydrocarbons, said medium being a non-solvent for the unsaturated polyester, and recovering and drying the resultant crystalline slurry.

11. The process of claim 10, wherein said liquid organic medium is methanol.

12. The process of claim 10, wherein at least one compound selected from the group consisting of symmetrical saturated dicarboxylic acids, the lower dialkyl esters of said acids and mixtures thereof is concomitantly condensed with said diol.

13. The process of claim 10, wherein said catalyst is selected from the group consisting of cyclic secondary amines, iodine and sulfur.

14. The process of claim 10, wherein the condensation reaction is carried out at a temperature of about 150° to 210° C.

15. The process of claim 10, wherein the weight ratio of polyester melt to liquid organic medium ranges from about 3:2 to 1:1.

References Cited

UNITED STATES PATENTS

| | | | |
|---|---|---|---|
| 2,595,679 | 5/1952 | Lew | 260—75 |
| 3,042,970 | 7/1962 | Terenzi | 18—47.3 |
| 3,334,070 | 8/1967 | Chezaud | 260—75 |
| 3,103,503 | 9/1963 | Fox et al. | 260—89.5 |
| 3,377,323 | 4/1968 | Ioka et al. | 260—78 |
| 3,390,134 | 6/1968 | Kibler | 260—75 |
| 3,396,128 | 8/1968 | Matumoto et al. | 260—22 |

WILLIAM H. SHORT, Primary Examiner

M. GOLDSTEIN, Assistant Examiner

U.S. Cl. X.R.

260—96